US008453668B2

(12) United States Patent
Michelli et al.

(10) Patent No.: US 8,453,668 B2
(45) Date of Patent: Jun. 4, 2013

(54) VACUUM RELIEF VALVE

(75) Inventors: Richard D. Michelli, Raleigh, NC (US); Dennis Vaders, Elkin, NC (US)

(73) Assignee: Parata System, LLC, Durham, NC (US)

( * ) Notice: Subject to any disclaimer, the term of this patent is extended or adjusted under 35 U.S.C. 154(b) by 391 days.

(21) Appl. No.: 12/842,342

(22) Filed: Jul. 23, 2010

(65) Prior Publication Data

US 2011/0094605 A1    Apr. 28, 2011

Related U.S. Application Data

(60) Provisional application No. 61/228,297, filed on Jul. 24, 2009.

(51) Int. Cl.
 *F16K 1/00* (2006.01)
(52) U.S. Cl.
 USPC ......... 137/114; 137/487.5; 137/907; 251/324
(58) Field of Classification Search
 USPC ..... 137/495, 872, 907, 114, 487.5; 251/30.02
 See application file for complete search history.

(56) References Cited

U.S. PATENT DOCUMENTS

| | | | | |
|---|---|---|---|---|
| 2,582,612 | A | * | 1/1952 | Williams ........................ 303/31 |
| 6,321,772 | B1 | * | 11/2001 | Uehara et al. ................. 137/112 |
| 6,578,605 | B2 | | 6/2003 | Cooper et al. |

OTHER PUBLICATIONS

Examiners Report for Canadian Patent Application No. 2,711,165 dated Feb. 29, 2012.

* cited by examiner

*Primary Examiner* — John K Fristoe, Jr.
*Assistant Examiner* — Kevin Barss
(74) *Attorney, Agent, or Firm* — Myers Bigel Sibley & Sajovec, P.A.

(57) ABSTRACT

A vacuum relief valve includes: a housing with a central cavity, the housing having a system branch, a vacuum branch, a pilot branch, and an exhaust branch, each of the branches in fluid communication with the central cavity and having a respective port; a piston assembly comprising a first disk located in the pilot branch, a second disk located adjacent the exhaust branch, and a connecting member to which the first and second disks are mounted; and an actuator attached to a pilot seal, the actuator configured to move the pilot seal between a closed position, in which the pilot seal is positioned in and seals the pilot port, and an open position, in which the pilot seal is spaced from and does not seal the pilot port. When the pilot seal is in the closed position, the second disk is positioned on and seals the exhaust port, and when the pilot seal is in the open position, the second disk is spaced from and does not seal the exhaust port. In this configuration, often a smaller, less expensive actuator may be used to actuate the valve.

17 Claims, 8 Drawing Sheets

VACUUM RELIEF VALVE

RELATED APPLICATION

This application claims priority from U.S. Provisional Patent Application No. 61/228,297, filed Jul. 24, 2009, the disclosure of which is hereby incorporated herein in its entirety.

FIELD OF THE INVENTION

The present invention relates generally to valves, and more particularly to vacuum relief valves.

BACKGROUND OF THE INVENTION

Mechanical systems commonly use a vacuum or other suction-inducing device to provide air flow through a portion of the system. Many such systems are susceptible to malfunction or damage in the event that the suction level becomes too high. As such, vacuum systems may include a vacuum relief valve that "breaks" the suction under certain suction conditions.

Standard vacuum relief valves typically come in one of two types. The first includes an actuator that operates to move one or more sealing components away from a sealing configuration, thereby breaking the seal and relieving the vacuum condition. Such valves require an actuator of sufficient strength to break the pressure; for example, the actuator may require a strong gear motor for operation. A second variety of vacuum valve relies on a pilot system. Traditional pilot valves have two stages. The first stage is typically a traditional plunger type valve, which feeds air from a pressurized source to a diaphragm or piston that serves as the second stage. The diaphragm or piston moves to open a larger orifice for the main flow.

It may be desirable to provide an alternative valve configuration.

SUMMARY OF THE INVENTION

As a first aspect, embodiments of the present invention are directed to a vacuum relief valve. The valve comprises: a housing with a central cavity, the housing having a system branch, a vacuum branch, a pilot branch, and an exhaust branch, each of the branches in fluid communication with the central cavity and having a respective port; a piston assembly comprising a first disk located in the pilot branch, a second disk located adjacent the exhaust branch, and a connecting member to which the first and second disks are mounted; and an actuator attached to a pilot seal, the actuator configured to move the pilot seal between a closed position, in which the pilot seal is positioned in and seals the pilot port, and an open position, in which the pilot seal is spaced from and does not seal the pilot port. When the pilot seal is in the closed position, the second disk is positioned on and seals the exhaust port, and when the pilot seal is in the open position, the second disk is spaced from and does not seal the exhaust port. In this configuration, often a smaller, less expensive actuator may be used to actuate the valve.

As a second aspect, embodiments of the present invention are directed to a vacuum relief valve, comprising: a housing with a central cavity, the housing having a system branch, a vacuum branch, a pilot branch, and an exhaust branch, each of the branches in fluid communication with the central cavity and having a respective port; a piston assembly comprising a lower disk located in the pilot branch, an upper disk located adjacent the exhaust branch, and a connecting member to which the lower and upper disks are mounted; and an actuator attached to a pilot seal, the actuator configured to move the pilot seal between a closed position, in which the pilot seal is positioned in and seals the pilot port, and an open position, in which the pilot seal is spaced from and does not seal the pilot port. When the pilot seal is in the closed position, the upper disk is positioned on and seals the exhaust port, and when the pilot seal is in the open position, the upper disk is spaced from and does not seal the exhaust port. The pilot seal contacts the lower disk in moving from the closed position to the open position.

DETAILED DESCRIPTION OF EMBODIMENTS OF THE INVENTION

Figure 1:
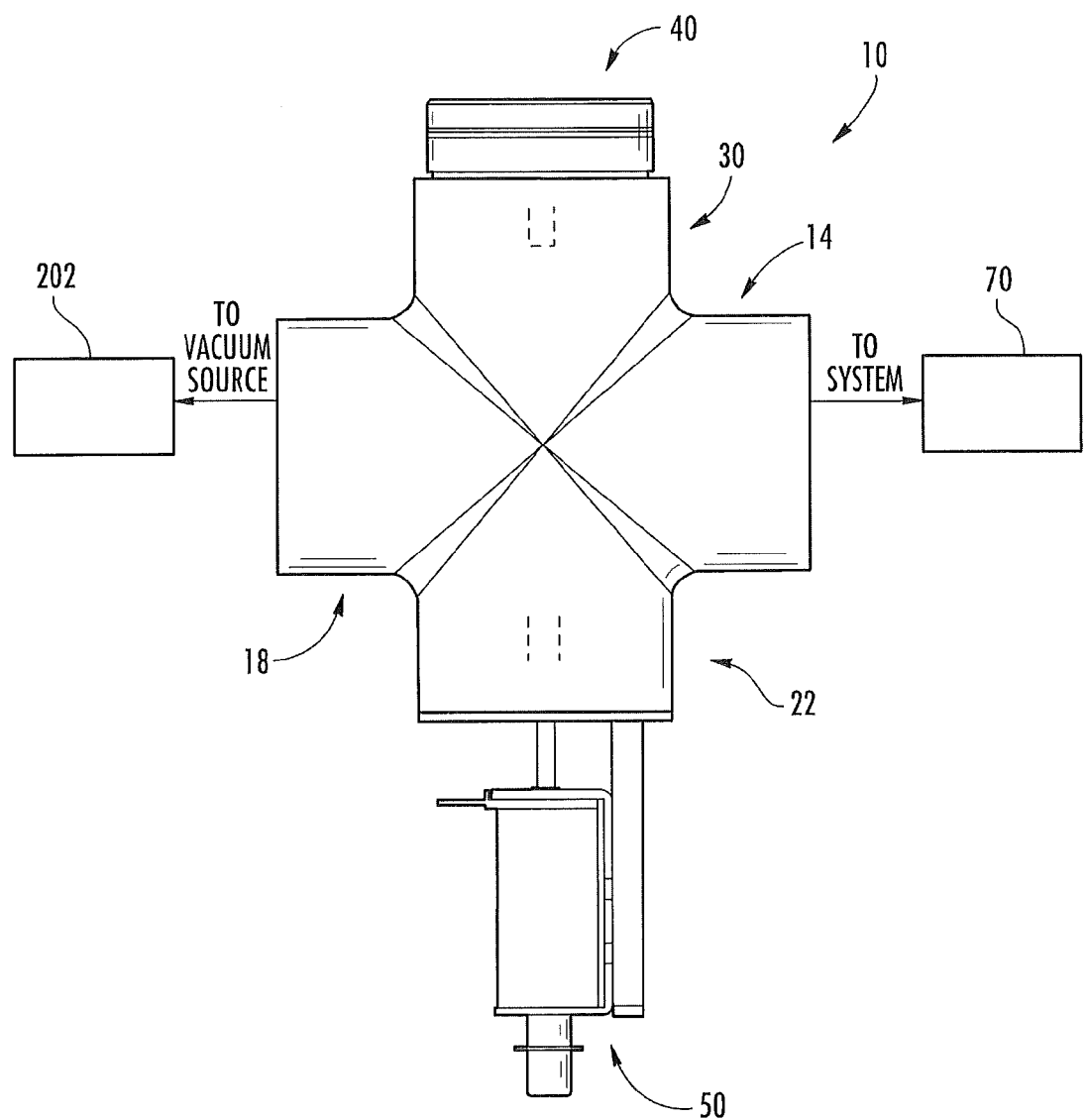
FIG. 1 is a front view of a vacuum relief valve according to embodiments of the present invention, with the valve in the closed position.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

As used herein, the term "forward" and derivatives thereof refer to the general direction vial carriers and vials travel as they move from station to station; this term is intended to be synonymous with the term "downstream", which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

Well-known functions or constructions may not be described in detail for brevity and/or clarity.

Referring now to the drawings, a vacuum relief valve, designated broadly at 10, is shown in FIGS. 1-5. The valve 10 includes a housing 12 with a central cavity 13 and four branches that radiate from the cavity 13: a system branch 14; a vacuum branch 18 that is positioned opposite the system branch 14; a pilot branch 22; and an exhaust branch 30 that is positioned opposite the pilot branch 22. These are described in greater detail below.

Figure 2:
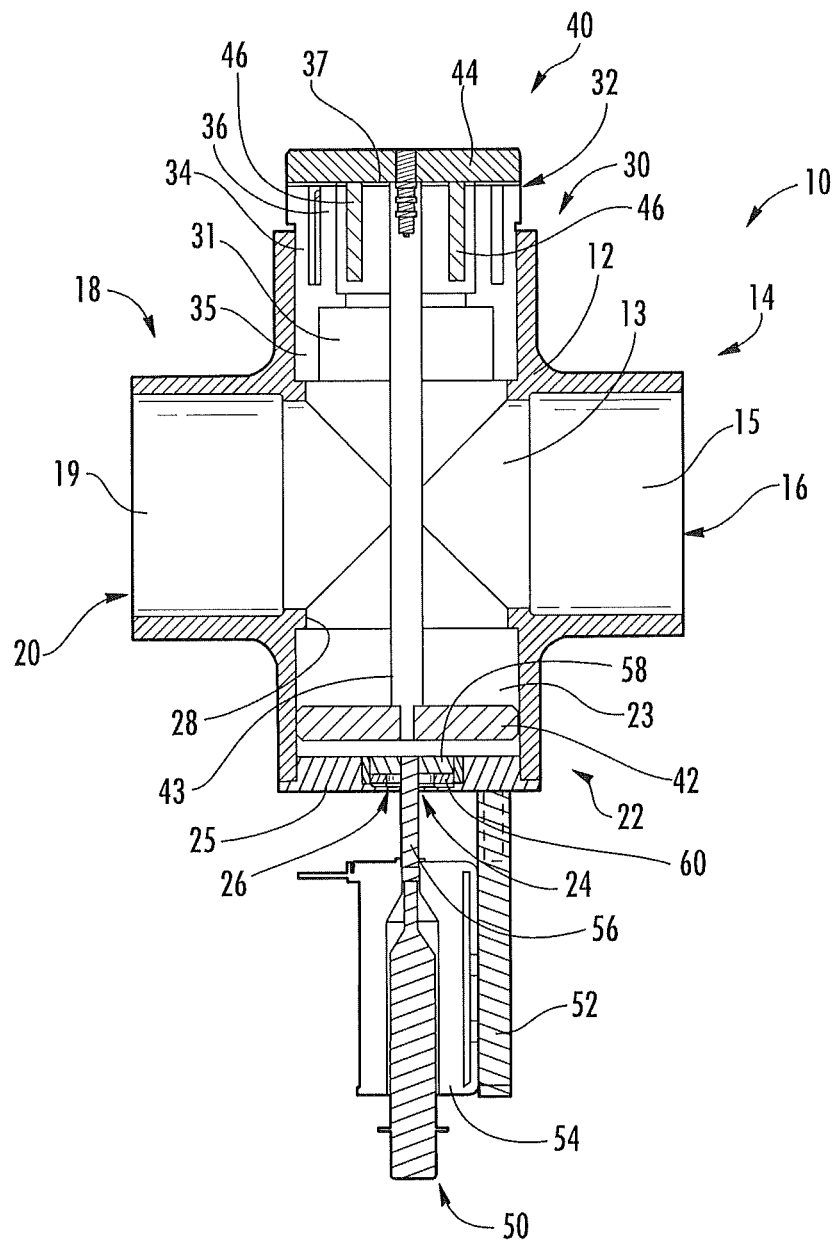
FIG. 2 is a front section view of the valve of FIG. 1, with the valve in the closed position.

Referring to FIG. 2, the system branch 14 includes a cavity 15 that is in fluid communication with the cavity 13 and an attached "system" 70 (e.g., the automated pharmaceutical dispensing machine 70 discussed below—see FIGS. 1 and 6) via a port 16. Similarly, the vacuum branch 18 includes a cavity 19 that is in fluid communication with the cavity 13 and with a vacuum source 202 (such as the compressor 202 discussed below—see FIGS. 1 and 7) via a port 20. Thus, when the valve 10 is in its closed position as in FIG. 2, the vacuum source 202 can apply suction to the system 70 via the system and vacuum branches 14, 18.

Referring still to FIG. 2, the pilot branch 22 includes a cavity 23 that is in fluid communication with the cavity 13. The pilot branch 22 includes an end cap 25 with a relatively small pilot port 24 that opens to the atmosphere. On its upper surface, the end cap 25 includes a recess 26 that surrounds and is somewhat wider than the pilot port 24. The pilot branch 22 also includes a shoulder 28 at its upper end adjacent the cavity 13.

Still referring to FIG. 2, the exhaust branch 30 includes a cavity 31 that is in fluid communication with the cavity 13. An exhaust port 32 connects the cavity 31 with the atmosphere. An insert 34 resides in the cavity 31 and has two narrowed sections 35, 36, with the narrowed section 36 being narrower than the section 35. Both of the narrowed sections 35, 36 are smaller in diameter than the cavity 23 of the pilot branch 22. An annular gasket 37 is mounted on the upper end of the insert 34.

Referring once again to FIG. 2, a piston assembly 40 has a lower disk 42 connected to an upper disk 44 via a rod 43. The lower disk 42 is positioned in the cavity 23 of the pilot branch 22 between the end cap 25 and the shoulder 28. In some embodiments, the diameter of the lower disk 42 is slightly smaller than the diameter of the cavity 23 (i.e., it forms an imperfect seal). The upper disk 44 rests atop the exhaust branch 30 and, in the closed position shown in FIG. 2, seals the exhaust port 32 from the atmosphere. In some embodiments, the upper disk 44 is smaller in diameter than the lower disk 42. Also, three stabilizing pins 46 (only two are shown herein) extend downwardly from the lower surface of the upper disk 44; these pins 46 are positioned circumferentially equally about the upper disk 44 to reside just radially inwardly of the inner edge of the gasket 37.

Referring still again to FIG. 2, an actuator 50 (e.g., a solenoid) is mounted to the housing 12 via a flange 52 that depends from the pilot branch 22. The actuator 50 includes a sleeve 54 that is mounted to the flange 52, a rod 56 that retracts within and extends from the sleeve 54, and a pilot seal 58 that is attached to the end of the rod 56. As shown in the closed position of FIG. 2, the rod 56 is retracted within the sleeve 54, and the pilot seal 58 (which has a gasket 60 on its underside to enhance sealing) resides within the recess 26 in the end cap 25, with the rod 56 extended through the pilot port 24. In this position, the pilot seal 58 seals the pilot port 24 from the atmosphere. It should also be noted that the pilot seal 58 is positioned just below the lower disk 42.

Figure 4:
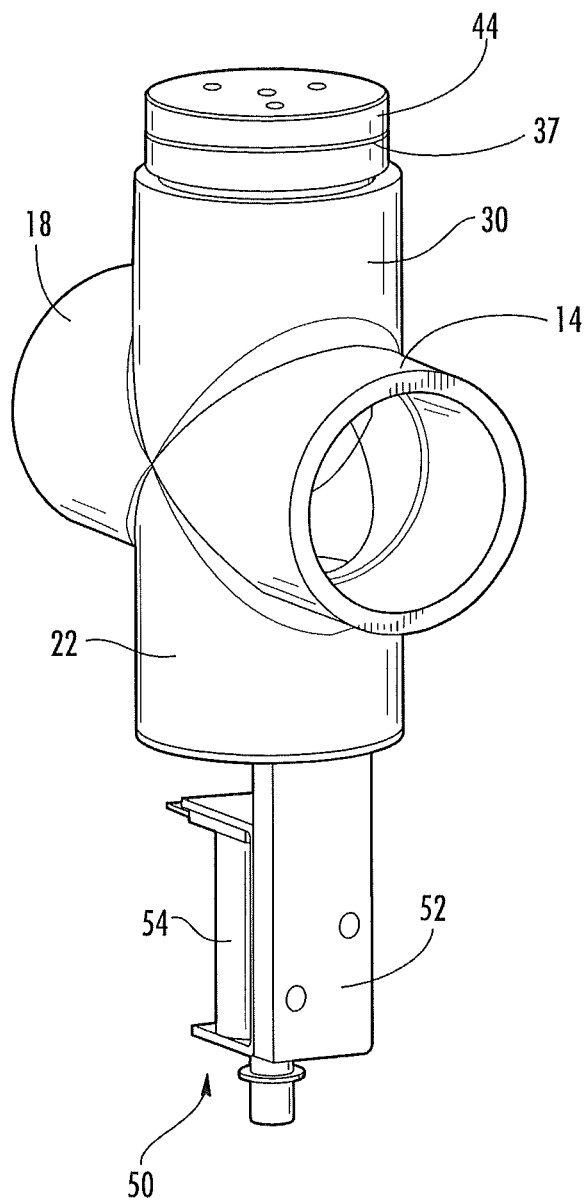
FIG. 4 is a perspective view of the valve of FIG. 1, with the valve in the closed position.

In operation, when the valve is in the closed position shown in FIGS. 2 and 4, the pilot seal 58 seals the pilot port 24, and the upper disk 44 seals the exhaust port 32. As such, a vacuum is maintained between the system 70 and the vacuum source 202 through the vacuum branch 18, the cavity 13, and the system branch 14.

Figure 3:
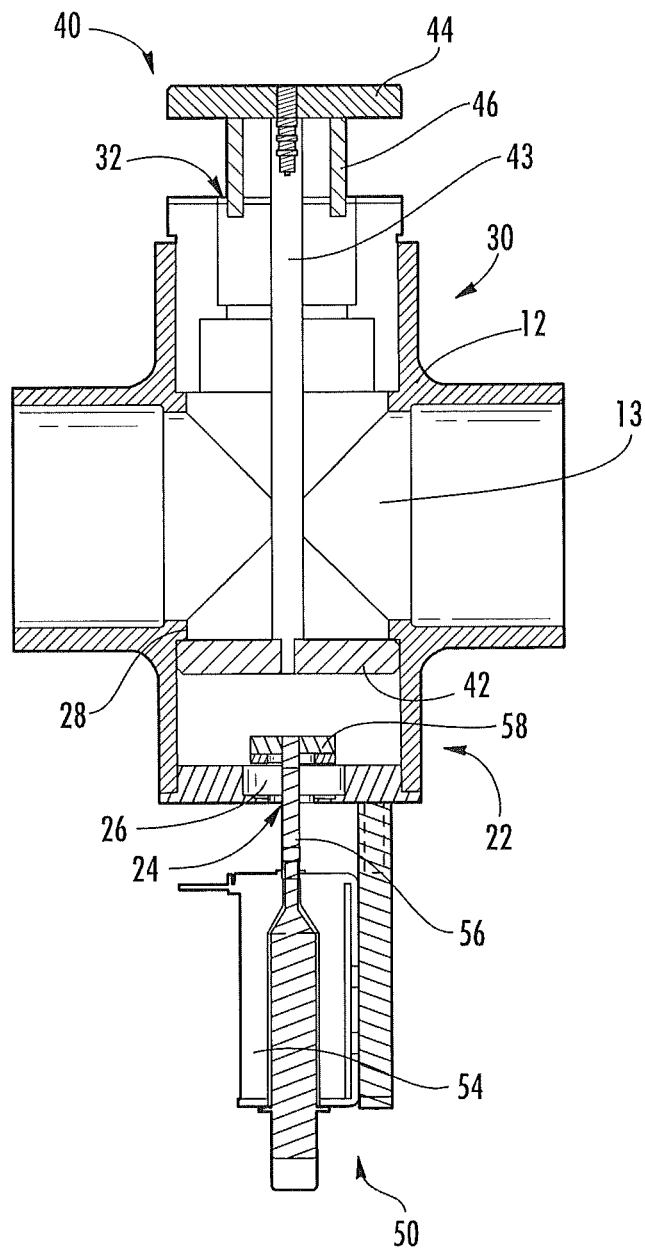
FIG. 3 is a front section view of the valve of FIG. 1 with the valve in the open position.
Figure 5:
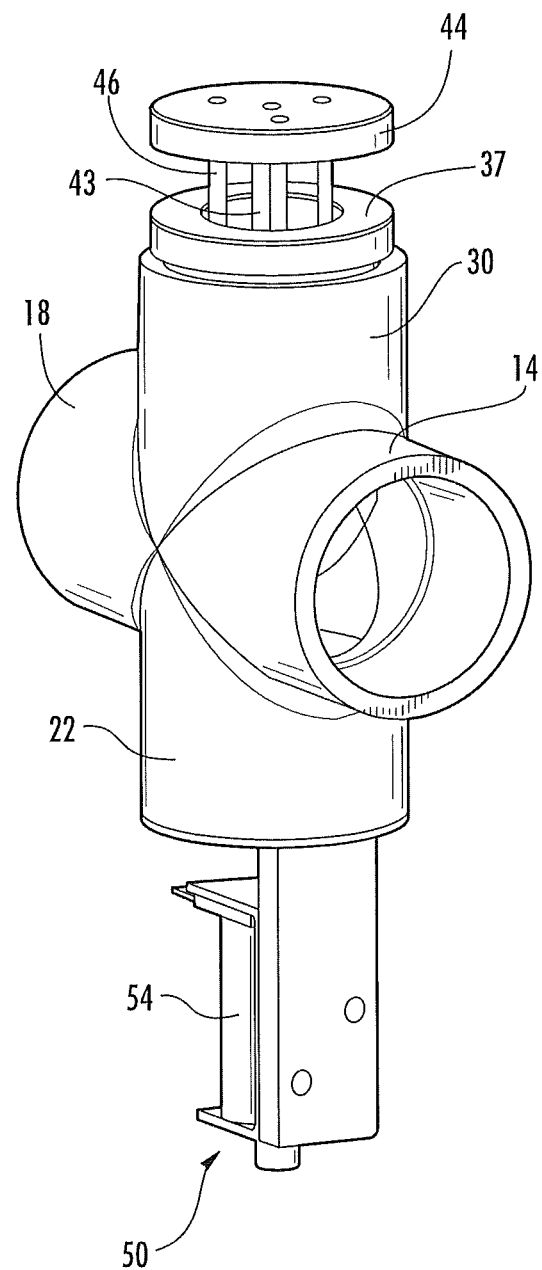
FIG. 5 is a perspective view of the valve of FIG. 1, with the valve in the open position.

When it is desired to break the vacuum within the valve 10, the actuator 50 is energized, which causes the rod 56 to extend from the sleeve 54 (see FIGS. 3 and 5). Extension of the rod 56 forces the pilot seal 58 upwardly, which drives the pilot seal 58 into the lower surface of the lower disk 42 and forces it upwardly. Also, the departure of the pilot seal 58 from the recess 26 allows atmospheric pressure to enter the cavity 23 through the pilot port 24. Upward movement of the lower disk 42 forces the rod 43 and, in turn, the upper disk 44 upwardly, such that the upper disk 44 disengages from the exhaust branch 30 and allows atmospheric pressure to enter the exhaust cavity 31. Thus, both the lower surface of the lower disk 42 and the upper surface of the upper disk 44 are exposed to atmospheric pressure (which is higher than the pressure within the cavity 13 of the housing 12). However, because the lower disk 42 has a larger surface area than the upper disk 44, the force generated on the lower disk 42 by the atmospheric pressure exceeds the opposing force generated on the upper disk 44. As a result, the lower and upper disks 42, 44 (as well as the rod 43) rise until the lower disk 42 strikes the shoulder 28 within the pilot branch 22. The pins 46 provide lateral stability to the piston assembly 40 as it rises. With the exhaust port 32 open, the cavity 13 of the housing 12 is at atmospheric pressure.

To close the valve, the actuator 50 is de-energized, which causes the rod 56 to retract within the sleeve 54 and move the pilot seal 58 back into the recess 26. The combination of (a) the weight of the piston assembly 40 and (b) the difference in force generated by the atmospheric pressure on the upper surface of the upper disk 44 and the vacuum acting on the lower surface of the upper disk 44, cause the piston assembly 40 to descend until the lower surface of the upper disk 44 rests against the annular gasket 37. With both the pilot seal 58 and the upper disk 44 sealing, respectively, the pilot port 22 and the exhaust port 32, the system 70 can again receive suction from the vacuum source 202 (see FIGS. 2 and 4).

In the described configuration, the valve 10 can operate with a relatively small actuator (one that only needs sufficient force to move the pilot seal 58 and bump into the lower disk 42). As such, considerable cost savings for the actuator may be realized.

Figure 6:
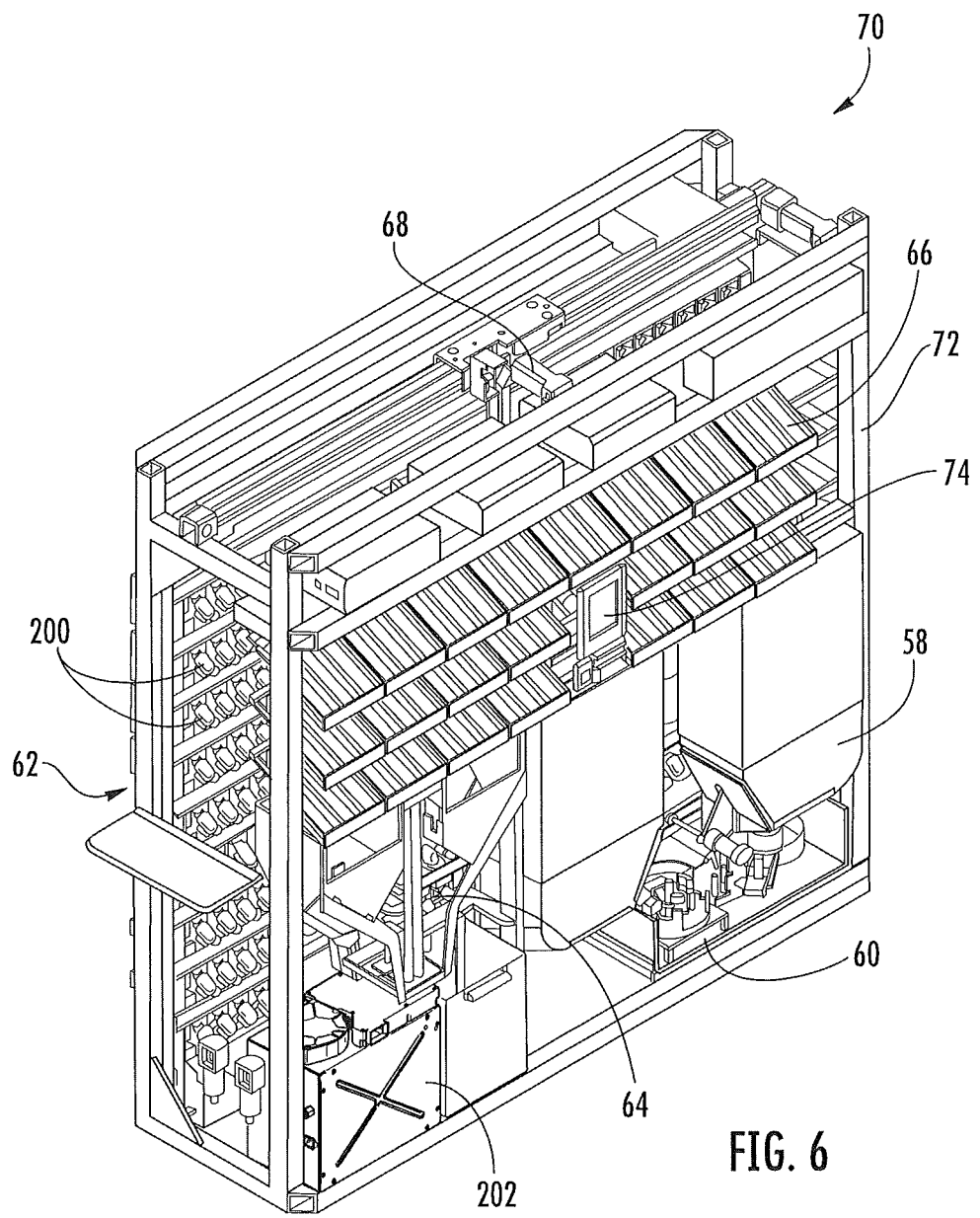
FIG. 6 is a perspective view of an automated pharmaceutical dispensing machine containing a valve of FIG. 1.

An automated pharmaceutical dispensing machine that may be suitable as a system for use with the valve 10 is illustrated in FIG. 6 and designated broadly therein at 70. The system 70 includes a support frame 72 for the mounting of its various components. The system 70 generally includes as operative stations a controller (represented herein by a graphics user interface monitor 74), a container dispensing station 58, a labeling station 60, a tablet dispensing station 62, a closure station 64, and an offloading station 66. In the illustrated embodiment, containers, tablets and closures are moved between these stations with a single carrier 68; however, in some embodiments additional carriers may be employed. The operation of the container dispensing station 58, the labeling station 60, the tablet dispensing station 62, the closure station 64, and the offloading station 66 are described in, for example, U.S. patent application Ser. Nos. 11/599,526; 11/599,576; 11/679,850; 11/693,929; 11/755,249; 11/927,865; and 11/111,270, the disclosure of each of which is hereby incorporated herein in its entirety.

Figure 7:
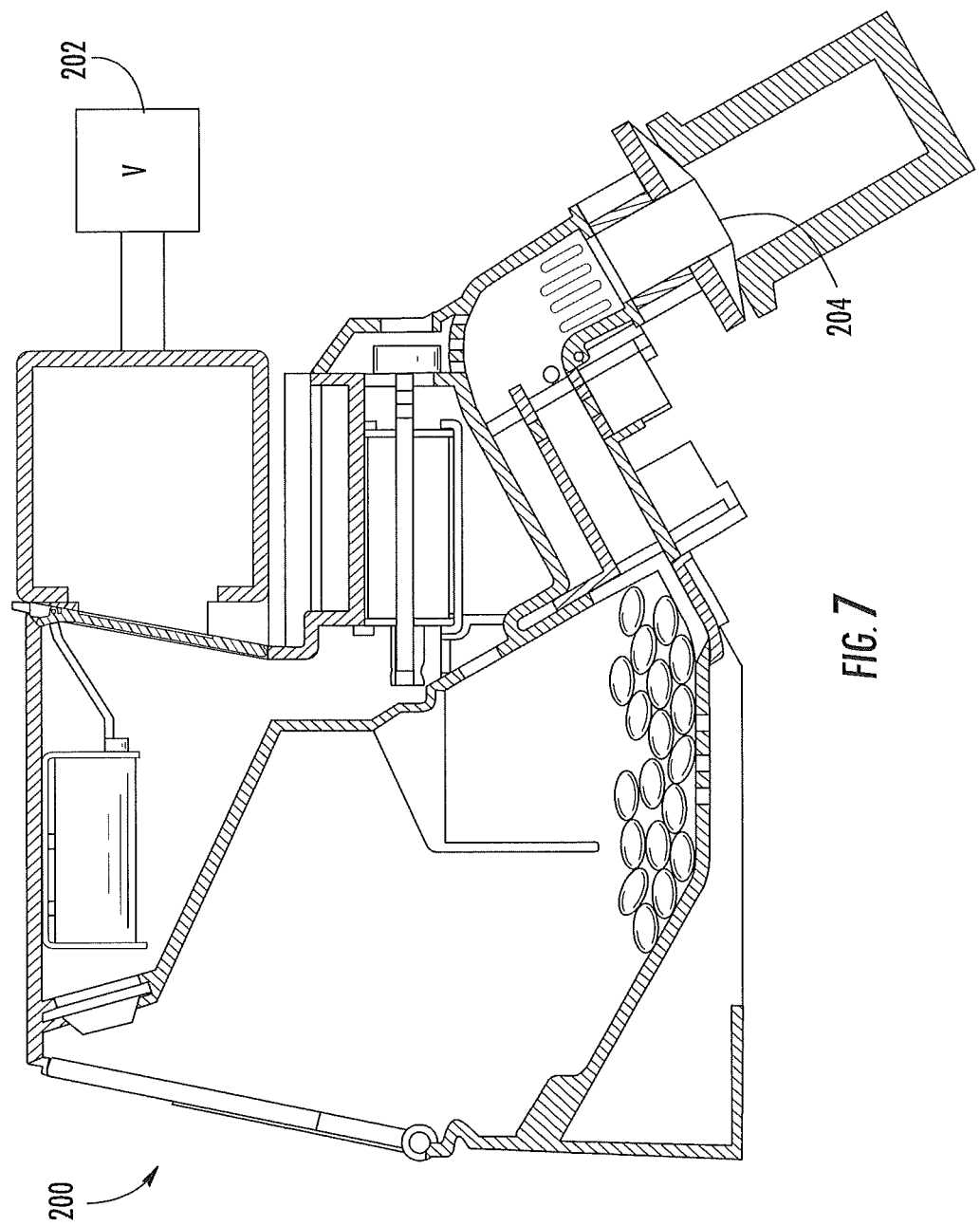
FIG. 7 is a side section view of a dispensing cell of the automated pharmaceutical dispensing machine of FIG. 6 showing the application of vacuum to the cell.

The tablet dispensing station 62 comprises a number of cells 200, each of which houses a plurality of pharmaceutical tablets. The cells 200 (one of which is illustrated in FIG. 7) are configured to count and dispense tablets into a pharmaceutical vial held by the carrier 68. Suction produced by the compressor 202 agitates tablets within a cell 200 and draws them into a nozzle 204, where they are counted and deposited into a pharmaceutical vial.

As can be seen in FIG. 6, the cells 200 are arranged in multiple rows, which each row of cells 200 being connected to a common manifold fluidly connected with the compressor 202. At times, (for example, if the machine is to be shut down for maintenance), the vacuum produced by the compressor 202 needs to be broken. As such, the valve 10, which can be connected with the compressor 202 and/or a manifold at any number of locations, can be employed to break the vacuum as needed or desired.

Figure 8:
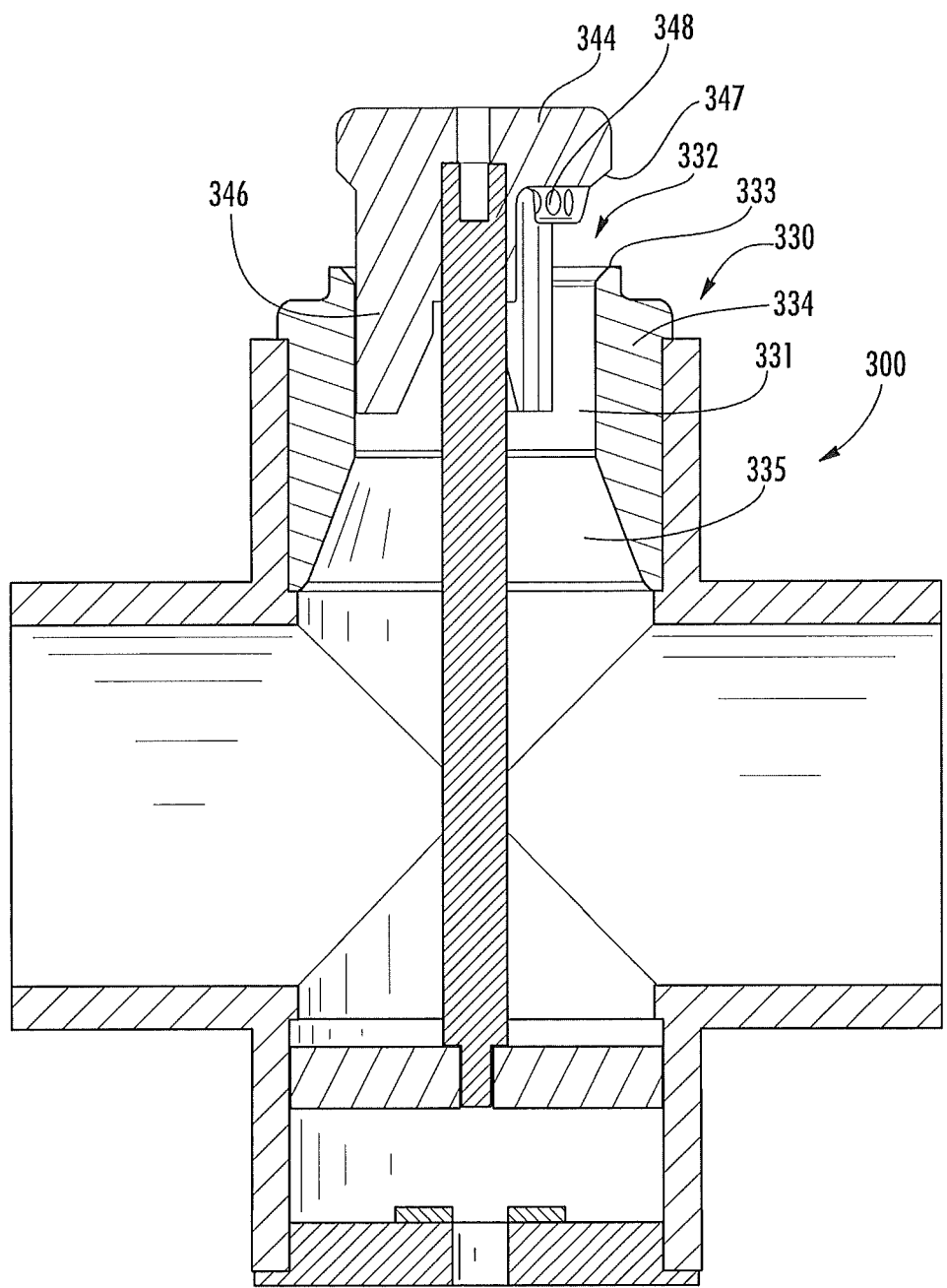
FIG. 8 is a front section view of a valve according to alternative embodiments of the present invention.

Another embodiment of a valve of the present invention, designated broadly at 300, is shown in FIG. 8. The valve 300 is similar to the valve 10 with the exception of the construction of the exhaust branch 330 and the upper disk 344. The exhaust branch 330 includes an insert 334 with a cavity 331 that has a tapered lower end 335. The exhaust port 332 itself has a beveled lip 333. The upper disk 344 has a lower extension 346 that fits within the bore of the cavity 331. The upper disk 344 also includes a beveled section 347 that is configured to engage the beveled lip 333 of the exhaust port 332. A series of metering holes 348 are included in a small flange that depends from the lower surface of the upper disk 344.

This modified configuration can help to address a particular condition that can arise with the valve 10. In some instances, when the valve 10 opens, there can be a high velocity (and therefore low pressure) region created between the upper disk 44 and the exhaust port 32 just as the upper disk 44 separates from the exhaust port 32. Under some circumstances, the low pressure created in this region may be sufficient to cause the upper disk 44 to "stick" to the exhaust port 32. The presence of the beveled lip 333 and the beveled section 347 in the valve 300 can help to mitigate this condition by modifying the direction of forces created by the low pressure area (making them less vertically directed). Also, the metering holes 348 can throttle the initial high velocity rush of air through the gap created by the beveled lip 333 and beveled section 347, which can also help to avoid "sticking" of the upper disk 344.

Also, in some embodiments the lower disk 342 is sized to be only slightly smaller in diameter than the pilot cavity 323. This configuration can allow for a controlled metering of the air out of the cavity 323, which can provide a slower and more controlled (i.e., dampened) closing rate.

Those skilled in this art will appreciate that the valve 10 may take other configurations. For example, the disks of the piston assembly may be of different sizes, or in some embodiments may be of the same size. The valve 10 may be oriented differently (e.g., horizontally, with all branches at approximately the same elevation). The valve may be actuated in a different manner. In some embodiments, the pilot seal may not contact the lower disk before the difference in pressure between the lower and upper disk causes the piston assembly to move. Other variations may also be employed.

Those of skill in this art will recognize that the valve may be employed in other systems. For example, a pneumatic conveying system for bulk material transport, or a pneumatic relay system such as might be used at banks with a drive-through teller system, may benefit from a valve of the configuration described above.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A vacuum relief valve, comprising:
   a housing with a central cavity, the housing having a system branch, a vacuum branch, a pilot branch, and an exhaust branch, each of the branches in fluid communication with the central cavity and having a respective port;
   a piston assembly comprising a first disk located in the pilot branch, a second disk located adjacent the exhaust branch, and a connecting member to which the first and second disks are mounted; and
   an actuator attached to a pilot seal, the actuator configured to move the pilot seal between a closed position, in which the pilot seal is positioned on and seals the pilot port, and an open position, in which the pilot seal is spaced from and does not seal the pilot port;
   wherein when the pilot seal is in the closed position, the second disk is positioned on and seals the exhaust port, and when the pilot seal is in the open position, the second disk is spaced from and does not seal the exhaust port;
   wherein the first disk has a surface that faces the pilot port having a first surface area, and the second disk has a surface that faces away from the exhaust port having a second surface area, and the first surface area exceeds the second surface area.

2. The valve defined in claim 1, wherein the pilot seal contacts the first disk in moving from the closed position to the open position.

3. The valve defined in claim 1, wherein the first disk is a lower disk and the second disk is an upper disk.

4. The valve defined in claim 1, wherein the actuator comprises a solenoid having a sleeve and a rod that retracts into and extends from the sleeve, and wherein the pilot seal is mounted on one end of the rod.

5. The valve defined in claim 1, wherein the pilot branch has a cavity, the exhaust branch has a cavity, and a diameter of the pilot branch cavity exceeds a diameter of the exhaust branch cavity.

6. The valve defined in claim 1, in combination with an automated pharmaceutical dispensing machine.

7. The valve defined in claim 1, wherein the first disk has a diameter that is slightly smaller than a diameter of the pilot cavity, such that movement of the first disk toward the pilot port is dampened.

8. The valve defined in claim 1, wherein the second disk has a beveled edge and the exhaust port has a beveled edge that mates with the beveled lip.

9. The valve defined in claim 8, wherein the beveled edge includes at least one metering holes.

10. A vacuum relief valve, comprising:
   a housing with a central cavity, the housing having a system branch, a vacuum branch, a pilot branch, and an exhaust branch, each of the branches in fluid communication with the central cavity and having a respective port;
   a piston assembly comprising a lower disk located in the pilot branch, an upper disk located adjacent the exhaust branch, and a connecting member to which the lower and upper disks are mounted; and
   an actuator attached to a pilot seal, the actuator configured to move the pilot seal between a closed position, in which the pilot seal is positioned on and seals the pilot port, and an open position, in which the pilot seal is spaced from and does not seal the pilot port;
   wherein when the pilot seal is in the closed position, the upper disk is positioned on and seals the exhaust port, and when the pilot seal is in the open position, the upper disk is spaced from and does not seal the exhaust port; and
   wherein the pilot seal contacts the lower disk in moving from the closed position to the open position;
   wherein the pilot branch has a cavity, the exhaust branch has a cavity, and a diameter of the pilot branch cavity exceeds a diameter of the exhaust branch cavity.

11. The valve defined in claim 10, wherein the first disk has a surface that faces the pilot port having a first surface area, and the second disk has a surface that faces away from the exhaust port having a second surface area, and the first surface area exceeds the second surface area.

12. The valve defined in claim 10, wherein the actuator comprises a solenoid having a sleeve and a rod that retracts into and extends from the sleeve, and wherein the pilot seal is mounted on one end of the rod.

13. The valve defined in claim 10, in combination with an automated pharmaceutical dispensing machine.

14. The valve defined in claim 10, wherein the first disk has a diameter that is slightly smaller than a diameter of the pilot cavity, such that movement of the first disk toward the pilot port is dampened.

15. The valve defined in claim 10, wherein the second disk has a beveled edge and the exhaust port has a beveled edge that mates with the beveled lip.

16. The valve defined in claim 15, wherein the beveled edge includes at least one metering holes.

17. A vacuum relief valve, comprising:
   a housing with a central cavity, the housing having a system branch, a vacuum branch, a pilot branch, and an exhaust branch, each of the branches in fluid communication with the central cavity and having a respective port;
   a piston assembly comprising a first disk located in the pilot branch, a second disk located adjacent the exhaust branch, and a connecting member to which the first and second disks are mounted; and
   an actuator attached to a pilot seal, the actuator configured to move the pilot seal between a closed position, in which the pilot seal is positioned on and seals the pilot port, and an open position, in which the pilot seal is spaced from and does not seal the pilot port;
   wherein when the pilot seal is in the closed position, the second disk is positioned on and seals the exhaust port, and when the pilot seal is in the open position, the second disk is spaced from and does not seal the exhaust port;
   wherein the first disk has a diameter that is slightly smaller than a diameter of the pilot cavity, such that movement of the first disk toward the pilot port is dampened.

* * * * *